3,148,030
RECOVERY OF BORON IN BORANE POLYMERS
AS BORON TRICHLORIDE
Frank H. May, Whittier, and Howard N. Hammar, Long Beach, Calif., assignors, by mesne assignments, to AFN, Inc., a corporation of Delaware
No Drawing. Filed Feb. 13, 1961, Ser. No. 89,604
2 Claims. (Cl. 23—205)

This invention relates to the recovery of boron values in borane polymer as boron trichloride and dichloroborane. Borane polymer, usually considered to be of the formula $(BH_x)_n$, is an unavoidable by-product in the pyrolysis of boron hydrides. The only method known heretofore for recovery of the boron value in the polymer is to heat the polymer to an elevated temperature whereat it decomposes to elemental boron and hydrogen.

We have discovered that borane polymer can be treated with a hydrohalide to recover the boron values of the polymer in a usable form as boron trihalide and a dihaloborane. This we achieve by first reacting the polymer with a hydrohalide, preferably hydrogen chloride, at a relatively low temperature of from about 150° to about 300° C. to form a small amount of volatile boron trichloride and a non-volatile boron sub-chloride. The borane polymer is stabilized by this reaction so that it is possible to raise the temperature to about 600°–750° C. where the stabilized polymer reacts further with hydrogen chloride to form $BCl_3$ and $BHCl_2$. Instead of hydrogen chloride one can use another hydrohalide such as hydrogen fluoride or hydrogen bromide.

The practice of the invention will become further apparent from the following.

*Example I*

To illustrate what happens when borane polymer is merely heated, a mass of the polymer was heated in a 13 mm. Vycor tube. The material in the hot zone became progressively darkened with increasing temperature and at 600° C. had turned to a black powder. Analysis of this heat treated material showed it to be 86 percent boron. Gas samples were taken at various intervals during the heating period and analyzed by I.R. analysis. No boranes or other volatile compounds were detected in the evolved hydrogen.

*Example II*

The borane polymer product of Example I does not react appreciably with hydrogen chloride below 1000° C. To demonstrate this, hydrogen chloride gas was passed over the heated polymer of Example I at 750° C. A gas sample of the exit gas stream was taken. Infrared analysis showed this gas to be principally hydrogen chloride, containing 0.8 mole percent $BCl_3$.

*Example III*

In accordance with this invention, 6.5 grams of polymer were placed in a 13 mm. Vycor tube in series with a gas sampling bulb and a water scrubber. This polymer had an initial analysis of 67.3 percent B, 7.5 percent Cl, and 7.3 percent H. The polymer was supported on Vycor chips and the tube was placed in a vertical tube furnace.

The tube furnace was heated to 200° C. with a small nitrogen sweep. Hydrogen chloride gas was then passed through the polymer and gas samples were taken periodically. When the boron trichloride in the exit gas had dropped to 2 mole percent, the tube was cooled and found to contain 9.8 grams, an increase of 3.3 grams. The material contained 47.0 percent B, 43.6 percent Cl, and 2.9 percent H. The furnace temperature was then raised to 750° C. and hydrogen chloride was again passed through the previously treated polymer. This was continued for 16 hours and until the boron trichloride in the exit gas had dropped below 2 mole percent. The tube was then cooled and found to contain 2.45 grams of residue analyzing 23.9 percent B, 33.4 percent Cl, and 1.1 percent H. A conversion of boron to $BCl_3$ of 86.5 percent was effected, based on the boron in the starting material and in the residue at the completion of the reaction.

Infrared analysis of the exit gas stream showed it to contain up to 34 mole percent $BCl_3$ (61 mole percent $BCl_3$ of the condensable gases).

*Example IV*

The operation of Example III was repeated with a borane polymer having a different composition. A quantity of 5.4 grams of polymer analyzing 78.4 percent B, 5.7 percent Cl, and 6.8 percent H was charged to the tube. At the end of the 200° C. treatment, 7.8 grams, an increase of 2.4 grams, of the material containing 54.0 percent B, 36.3 percent Cl, and 3.1 percent H were obtained. At the end of the reaction with HCl at 750° C., 1.6 grams of residue remained containing 23.3 percent B, 18.6 percent Cl, and 1.8 percent H. A conversion of the initial boron to boron trichloride of 88.2 percent was obtained, based on the boron in the starting material and in the residue at the completion of the reaction.

*Example V*

Chlorination of the polymer can be carried out rapidly in a closed system in an HCl atmosphere. When a bomb having a volume of 175 cc. and containing 1.6 grams of polymer analyzing 67.3 percent B, 7.5 percent Cl, was heated rapidly to 190° C. in an atmosphere of HCl at 200 p.s.i., and then cooled, 2.4 grams of a product analyzing 47.5 percent B and 46.5 percent Cl were obtained. The product appears to be the same as the product when polymer is hydro-chlorinated at 200° C. at atmospheric pressure in a tube furnace.

The polymer used in the foregoing examples had been produced under conditions which permitted a partial degradation due to hydrolysis during recovery. Such hydrolysis seals the surface of the polymer and so drastically reduces the reactive properties of the polymer. On a larger scale, one should recover the polymer and transfer it in an inert atmosphere to prevent such degradation. Such a polymer would require treatment for a much shorter period of time than was required in the foregoing examples.

It will also be observed in Examples II–IV that the hydrogen chloride gas was merely passed over the surface of the polymer. It will be obvious that agitation would greatly aid in the rate of reaction. Thus, the individual samples so differed in reactivity, some being reacted in 6–7 hours while others took as much as 16 hours as in Example III. In a large scale operation, with an active polymer and suitable equipment to provide agitation, the reaction will be accomplished within one or two hours at the most.

We claim:

1. A process for the recovery of boron values from a borane polymer having the formula $(BH_x)_n$ comprising heating the polymer in the presence of hydrogen chloride at a temperature of about 150° to about 300° C. to react the polymer with hydrogen chloride, and continuing the reaction until the evolution of boron trichloride has substantially ceased, thereafter reacting the resulting material with additional hydrogen chloride at a temperature of about 600°–750° C. until the further evolution of boron trichloride ceases, and recovering the product.

2. A process for the recovery of boron values from a borane polymer having the formula $CBH_x)_n$ comprising heating the polymer in the presence of a hydrogen halide at a temperature of about 150° to about 300° C. to react the polymer with the hydrogen halide, and continuing the reaction until the evolution of boron trihalide has substantially ceased, thereafter reacting the resulting material with additional hydrogen halide at a temperature of about 600–750° C. until the further evolution of boron trihalide ceases, and recovering the product.

No references cited.